(12) United States Patent
Tang et al.

(10) Patent No.: US 11,964,461 B2
(45) Date of Patent: Apr. 23, 2024

(54) COMPOSITE STRUCTURAL CHROMOGENIC MATERIAL WITH STABLE STRUCTURE AND PREPARATION METHOD THEREFOR

(71) Applicant: DALIAN UNIVERSITY OF TECHNOLOGY, Liaoning (CN)

(72) Inventors: Bingtao Tang, Liaoning (CN); Fantao Meng, Liaoning (CN); Suli Wu, Liaoning (CN); Shufen Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 42 days.

(21) Appl. No.: 17/631,267

(22) PCT Filed: Jun. 3, 2020

(86) PCT No.: PCT/CN2020/094112
§ 371 (c)(1),
(2) Date: Jul. 25, 2022

(87) PCT Pub. No.: WO2021/017631
PCT Pub. Date: Feb. 4, 2021

(65) Prior Publication Data
US 2023/0142236 A1    May 11, 2023

(30) Foreign Application Priority Data
Jul. 30, 2019   (CN) .......................... 201910696395.6

(51) Int. Cl.
B32B 7/05       (2019.01)
B32B 27/08      (2006.01)
(Continued)

(52) U.S. Cl.
CPC ............... *B32B 7/05* (2019.01); *B32B 27/08* (2013.01); *B32B 37/0076* (2013.01);
(Continued)

(58) Field of Classification Search
None
See application file for complete search history.

(56) References Cited

FOREIGN PATENT DOCUMENTS

CN    106199770 A    12/2016
CN    108387963 A    8/2018
(Continued)

OTHER PUBLICATIONS

CN106199770A cited on IDS, full Machine Translation via EPO (Year: 2016).*
(Continued)

*Primary Examiner* — Laura C Powers
(74) *Attorney, Agent, or Firm* — NKL Law; Allen Xue

(57) ABSTRACT

A structurally stable composite structural chromogenic material and a preparation method thereof are provided. The structurally stable composite structural chromogenic material is formed by stacking a transparent thermoplastic polymer and a structural chromogenic material layer by layer and then thermally bonding the peripheral edges of the polymer into a whole, and the upper surface layer and the lower surface layer of the material are both thermoplastic polymers. The molded composite structure has relatively obvious structural color and good mechanical strength.

9 Claims, 4 Drawing Sheets

(51) Int. Cl.
    *B32B 27/30*    (2006.01)
    *B32B 27/40*    (2006.01)
    *B32B 37/00*    (2006.01)
(52) U.S. Cl.
    CPC ............. *B32B 27/304* (2013.01); *B32B 27/40* (2013.01); *B32B 2250/24* (2013.01); *B32B 2250/40* (2013.01); *B32B 2255/10* (2013.01); *B32B 2255/26* (2013.01); *B32B 2274/00* (2013.01); *B32B 2307/412* (2013.01); *B32B 2327/06* (2013.01); *B32B 2375/00* (2013.01)

(56) References Cited

FOREIGN PATENT DOCUMENTS

| | | |
|---|---|---|
| CN | 110561872 A | 12/2019 |
| EP | 1253461 A2 | 10/2002 |
| JP | H1138454 A | 2/1999 |

OTHER PUBLICATIONS

CN108387963A cited on IDS, full Machine Translation via EPO (Year: 2018).*

* cited by examiner (a) (b)

COMPOSITE STRUCTURAL CHROMOGENIC MATERIAL WITH STABLE STRUCTURE AND PREPARATION METHOD THEREFOR

TECHNICAL FIELD

The present disclosure relates to a structurally stable composite structural chromogenic material and the preparation method thereof, belonging to the field of new material preparation.

BACKGROUND

Chemical dyeing pollution is the main source of industrial pollution. The dyeing and finishing process may produce a lot of polluted wastewater and toxic substances, which seriously affect the ecological environment. At the same time, this chemical color may gradually fade or disappear due to the influence of environmental factors.

It is worth noting that structural color is considered as an alternative coloring approach, which comes from the interaction of visible light with microphysical structure. The structural color comprises iridescence and non-iridescence, wherein photonic crystal is a periodic ordered dielectric structure with photonic band gaps. When the photonic band gaps are within the range of visible wavelength, photonic crystal can present rainbow colors. Non-iridescence can be displayed by amorphous photonic structures with a characteristic size of wavelength of visible light. The microstructure units of non-iridescence are arranged in short-range order and long-range disorder. However, at present, the colloidal microsphere array of artificially constructed structural chromogenic material has no external protection and poor structural stability, thereby limiting its wide application. Therefore, it is of great significance to investigate the structurally stable structural chromogenic material.

SUMMARY OF THE INVENTION

It is an object of the present disclosure to provide a structurally stable composite structural chromogenic material and a preparation method thereof.

A structurally stable composite structural chromogenic material, which is formed by stacking transparent thermoplastic polymer and structural chromogenic material layer by layer and then thermally bonding peripheral edges of the polymers into a whole, wherein an upper surface layer and an lower surface layer of the material are both thermoplastic polymers.

The structurally stable composite structural chromogenic material of the present disclosure is formed by stacking the polymer and structural chromogenic material layer by layer from bottom to top. This structure fixes the structural chromogenic material between the continuous polymer layers on both sides to stabilize the structure.

Further, the number of layers of the composite structural chromogenic material of the present disclosure can be selected and combined according to the required color, pattern and other requirements of effect, and there are no special restrictions in principle. The composite structural chromogenic material is obtained by stacking the polymer layers and structural color layers with at least three layers, that is, a structural color layer is sandwiched between the two polymer layers. When stacking, the structural color layer and the polymer layer are stacked upward in order, ensuring that each structural color layer is sandwiched between two polymer layers.

Further, the total number of layers of the composite structural chromogenic material is 3 to 15.

In the structurally stable composite structural chromogenic material of the present disclosure, the structural chromogenic material is a film built of micro-nano spheres by ordered or disordered stacking. The micro-nano spheres are arranged or stacked between the polymer layers on both sides to build a structure of single-layer arrangement or multi-layer stacking. The arrangement and stacking may be ordered or disordered.

In the structurally stable composite structural chromogenic material of the present disclosure, the structural chromogenic material includes micro-nano spheres, and may also include adhesive and/or black pigment. The co-assembly of the micro-nano spheres and the adhesive can further enhance the stability of the structure, and the addition of the black pigment can further enhance the saturation of structural color.

Preferably, the structural chromogenic material includes an adhesive and a mass fraction of the adhesive in the emulsion of micro-nano sphere ranges from 0% to 20%.

Preferably, the adhesive is at least one of dopamine and derivatives thereof, Arabic gum, natural gum, natural rubber, polyurethane, polyurea, polyacrylate, phenolic resin, epoxy resin, and polyvinyl alcohol.

In the structurally stable composite structural chromogenic material of the present disclosure, the micro-nano spheres are inorganic microspheres or heat-resistant organic microspheres.

The heat-resistant organic microsphere of the present disclosure is organic microsphere with vitrification temperature higher than that of the thermoplastic polymer.

In the structurally stable composite structural chromogenic material of the present disclosure, the micro-nano spheres are solid or hollow.

In the structurally stable composite structural chromogenic material of the present disclosure, a diameter of the micro-nano sphere ranges from 10 to 1000 nm.

Preferably, the structural chromogenic material is a film built of micro-nano spheres by ordered or disordered stacking. The micro-nano spheres are inorganic microspheres or heat-resistant organic microspheres with a diameter of 10 to 1000 nm. The microspheres are solid or hollow.

Further, the inorganic microsphere is silicon dioxide microsphere, titanium dioxide microsphere, zinc oxide microsphere, alumina microsphere, zirconium dioxide microsphere, or vanadium pentoxide microsphere.

Further, the heat-resistant organic microsphere is cross-linked polymer microsphere or sulfur-containing resin microsphere.

Further, the micro-nano sphere of the present disclosure is bisphenol formaldehyde resin microsphere.

The above inorganic microspheres and heat-resistant organic microspheres can be prepared by the method disclosed in the prior art.

Further, the thermoplastic polymer is one of polyethylene, polypropylene, polyvinyl chloride, polystyrene, polyformaldehyde, polycarbonate, polyamide, acrylic plastic, linear polyolefin and copolymer thereof, polysulfone, polyphenyl ether, polyurethane, polytetrafluoroethylene, and polyethylene terephthalate.

The said linear polyolefin refers to the linear polyolefin except polyethylene, polypropylene, polyvinyl chloride, polystyrene, and acrylic plastics.

Further, the thermoplastic polymer of the present disclosure is polyvinyl chloride (PVC) film and thermoplastic polyurethane (TPU) film.

Another object of the present disclosure is to provide a method for preparing the structurally stable composite structural chromogenic material.

Two alternative technical solutions for preparing the structurally stable structural chromogenic material are disclosed in the present disclosure.

A method for preparing the structurally stable composite structural chromogenic material, including the following steps of:

Orderly or disorderly assembling an emulsion of micro-nano sphere with a solid content of 5% to 30% on a transparent thermoplastic polymer layer to build a structural color layer; covering another transparent thermoplastic polymer layer on the obtained thermoplastic polymer layer coated with the structural color layer, and hot-pressing to bond the peripheral edges of the two thermoplastic polymer layers to form a whole to obtain a structurally stable composite structural chromogenic material unit; and hot-pressing to bond the peripheral edges of the thermoplastic polymer layers of the obtained composite structural chromogenic material units and the two contacting polymer layers to form a whole.

Another method for preparing the structurally stable composite structural chromogenic material, including the following processing steps of:

Orderly or disorderly assembling an emulsion of micro-nano sphere with a solid content of 5% to 30% on a transparent thermoplastic polymer layer to build a structural color layer; covering another transparent thermoplastic polymer layer on the obtained thermoplastic polymer layer coated with the structural color layer, repeating the above operations until obtaining a target number of layers, and hot-pressing to bond all the peripheral edges of the thermoplastic polymer layers to form a whole; and hot-pressing in steps until obtaining the target number of layers.

In the above two technical solutions of the preparation methods, in the preparation process of the structural color layer, the micro-nano spheres are co-assembled with an adhesive, wherein the adhesive is at least one of dopamine and derivatives thereof, Arabic gum, natural gum, natural rubber, polyurethanes, polyureas, polyacrylates, phenolic resins, epoxy resins, and polyvinyl alcohols. The mass fraction of the adhesive in the emulsion of micro-nano spheres ranges from 0% to 20%.

In the above two technical solutions of the preparation methods, the methods of orderly assembling micro-nano spheres on the thermoplastic polymer layer includes heating assembly, deposition, blade coating, and spin casting; and the methods of disorderly assembling micro-nano spheres on the thermoplastic polymer layer includes drop casting, spraying coating, and printing.

In the above two technical solutions of the preparation methods, an equipment bonding two thermoplastic polymer layers into a whole is a hot-pressing equipment, wherein the temperature of the hot-pressing ranges from 80 to 250° C. and pressure ranges from 4 to 16 kN. The beneficial effect of the present disclosure The thermoplastic material is one of the most widely used polymers in daily life, having the advantages of convenient processing and good comprehensive performance. The combination of commercial thermoplastic material and structural color is a new, economy and environmental protection strategy. The obtained composite structure has relatively obvious structural color and good mechanical strength, overcoming the shortcomings of poor structural stability of the structural chromogenic materials. This method has the advantages of simple operation and low costs, is suitable for large-scale application and can conveniently achieve patterning, which can be applied in the fields of daily necessities, packaging, decoration and the like.

DETAILED DESCRIPTION OF DRAWINGS

DETAILED DESCRIPTION OF PREFERRED EMBODIMENTS

Figure 1:
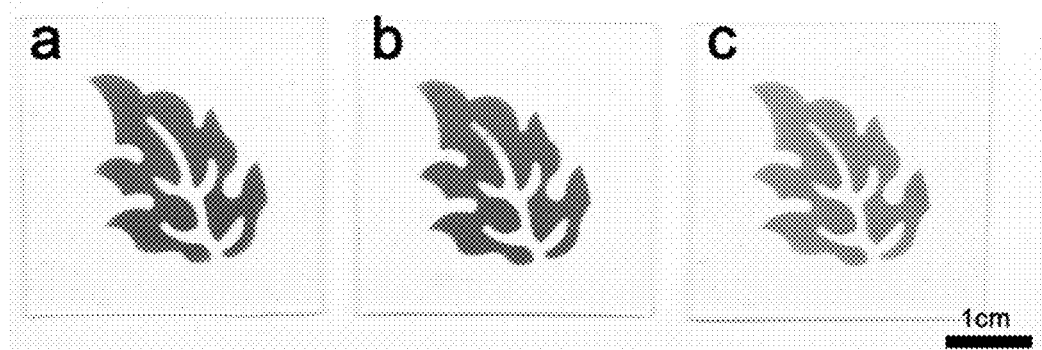
FIG. 1 shows photographs of the structurally stable composite structural chromogenic material obtained in Embodiment 1.
Figure 2:
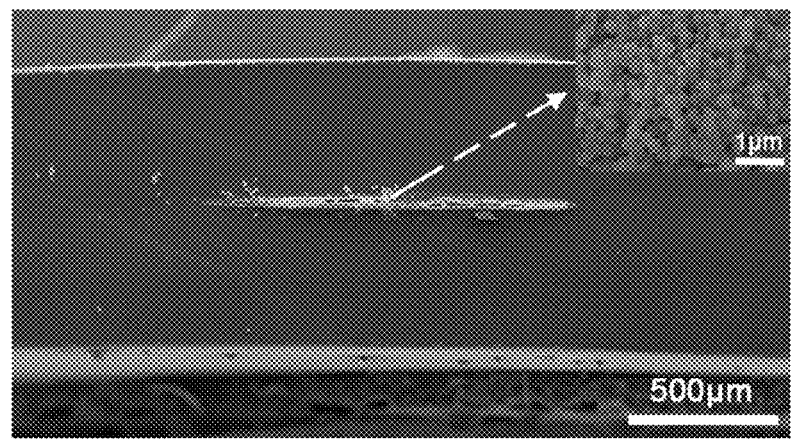
FIG. 2 is a cross-sectional scanning electron microscopy photograph of the structurally stable composite structural chromogenic material c obtained in Embodiment 1.
Figure 3:
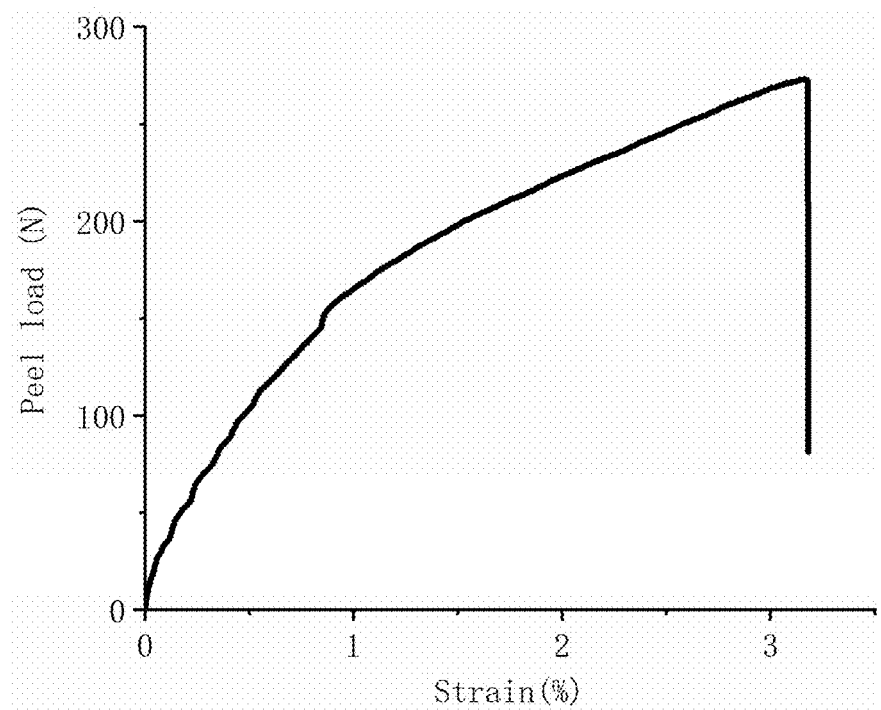
FIG. 3 is a peel curve of PVC test sample prepared under the hot-pressing condition in Embodiment 1 (the width of the spline is 2.5 cm, and the overlap length of the hot-pressing is 5 mm), indicating that the peel load is 273 N.
Figure 4:
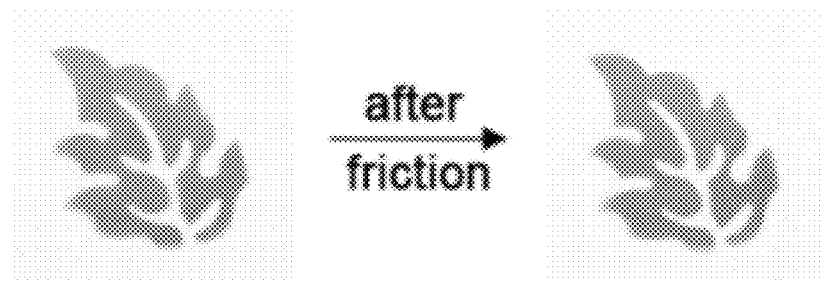
FIG. 4 is a comparison diagram before and after the friction test of the structurally stable composite structural chromogenic material c obtained in Embodiment 1. The test condition is of horizontally dragging the material with a load of 1 kg on 100 mesh sandpaper for 10 cm at a speed of 5 cm/s for reciprocating 15 times.
Figure 5:
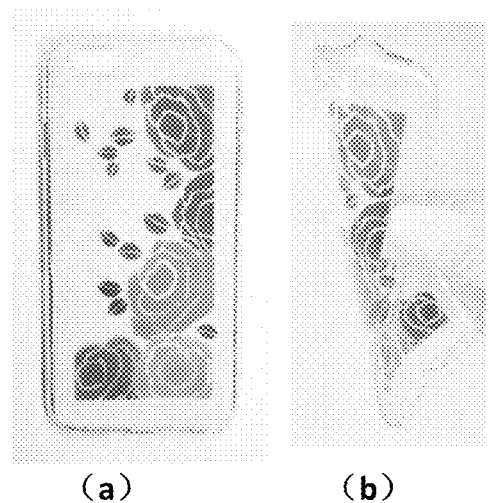
FIG. 5 shows photographs of normal and warped mobile phone shells of the structurally stable composite structural chromogenic material obtained in Embodiment 2.
Figure 6:
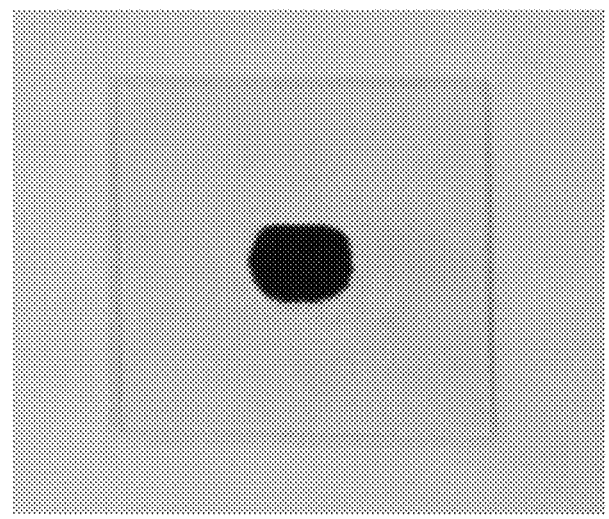
FIG. 6 is a photograph of the structurally stable composite structural chromogenic material obtained in Embodiment 3.
Figure 7:
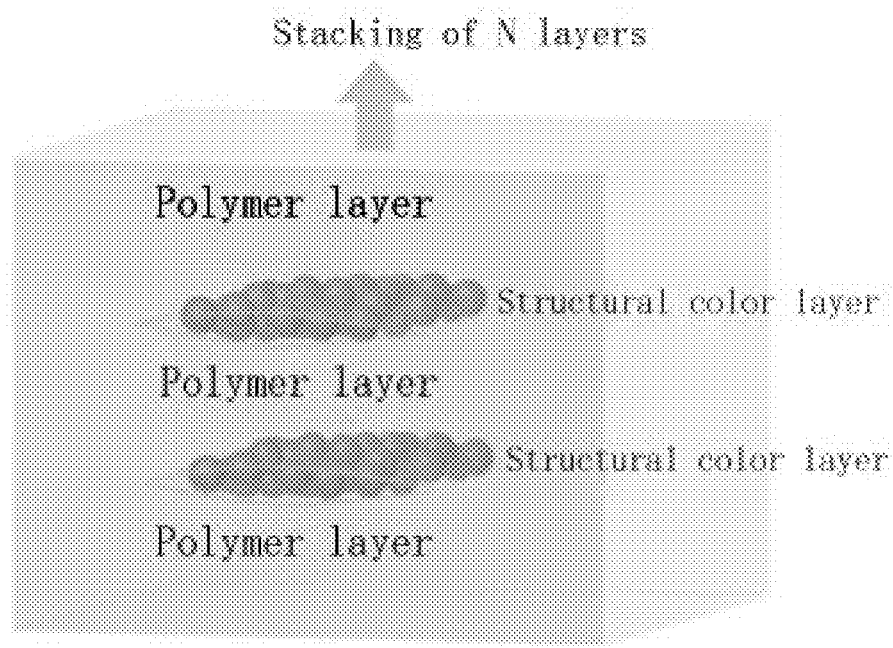
FIG. 7 is a schematic diagram of the structurally stable composite structural chromogenic material of the present disclosure.

The following non-limiting embodiments may enable those ordinary skilled in the art to understand the present disclosure more comprehensively, however, they do not intend to limit the present disclosure in any way.

The test methods in the following embodiments are conventional methods unless otherwise specified. The reagents and materials can be commercially obtained unless otherwise specified.

Embodiment 1

1. Under the cover of a hollow-out mold, using spraying method, the emulsions of bisphenol formaldehyde resin microspheres with diameters of 283 nm, 239 nm and 197 nm respectively, having a solid content of 10%, were sprayed on the PVC film to disorderly assemble and prepare amorphous photonic structure patterns with three colors.

2. The hot-pressing equipment was preheated to 120° C. Another PVC film layer was covered on the PVC film having amorphous photonic structure patterns and the two PVC film layers were bonded into a whole by hot-pressing with a pressure of 8 kN, to obtain a structurally stable composite structural chromogenic material. The structural stability was verified by peel test. The peel load of the PVC test sample prepared under this hot-pressing condition was 273 N. Further, through the friction test, the composite structural chromogenic material with a load of 1 kg was horizontally dragged on 100 mesh sandpaper for 10 cm at a speed of 5 cm/s for reciprocating 15 times. The shape and color of the patterns were maintained.

Embodiment 2

1. The emulsions of bisphenol formaldehyde resin microspheres with diameters of 283 nm, 239 nm and 197 nm respectively, having a solid content of 10%, were mixed with carbon black aqueous solution having a solid content of 0.01 g/mL at the mass ratio of 20:1 to prepare mixed emulsions. Under the cover of a hollow-out mold, using spraying method, the three kinds of mixed emulsions of bisphenol formaldehyde resin microspheres were respectively sprayed on the TPU film to disorderly assemble and prepare amorphous photonic structure patterns.

2. The hot-pressing equipment was preheated to 120° C. A TPU mobile phone shell was covered on the TPU film having amorphous photonic structure patterns. The two TPU film layers were bonded into a whole by hot-pressing with a pressure of 8 kN, to obtain a mobile phone shell of structurally stable composite structural chromogenic material.

Embodiment 3

1. Using heating assembly method, a PVC film was placed on the heating plate at a temperature of 60° C., and the emulsion of bisphenol formaldehyde resin microspheres having a solid content of 10% and a diameter of 283 nm was orderly assembled on the PVC film to prepare the photonic crystal.

2. The hot-pressing equipment was preheated to 120° C. Another PVC film layer was covered on the PVC film having the photonic crystal layer. The two PVC film layers were bonded into a whole through hot-pressing with a pressure of 8 kN, to obtain a structurally stable composite structural chromogenic material.

Embodiment 4

1. Under the cover of a hollow-out mold, using spraying method, the emulsion of silicon dioxide microspheres having a solid content of 10% was sprayed on the PVC film to disorderly assemble and prepare amorphous photonic structure patterns.

2. The hot-pressing equipment was preheated to 120° C. Another PVC film layer was covered on the PVC film having amorphous photonic structure patterns. The two PVC film layers were bonded into a whole through hot-pressing with a pressure of 8 kN, to obtain a structurally stable composite structural chromogenic material.

Embodiment 5

1. Under the cover of a hollow-out mold, using drop-casting method, the emulsion of polysulfide resin microspheres having a solid content of 10% was disorderly assembled on the TPU film to prepare amorphous photonic structure patterns.

2. The hot-pressing equipment was preheated to 110° C. Another TPU film layer was covered on the TPU film having amorphous photonic structure patterns. The two TPU film layers were bonded into a whole through hot-pressing with a pressure of 8 kN, to obtain a structurally stable composite structural chromogenic material.

Embodiment 6

1. Using blade coating method, the emulsion of titanium dioxide microspheres having a solid content of 10% was orderly assembled on the PVC film to prepare photonic crystal.

2. The hot-pressing equipment was preheated to 120° C. Another PVC film layer was covered on the PVC film having the photonic crystal layer. The two PVC film layers were bonded into a whole through hot-pressing with a pressure of 8 kN, to obtain a structurally stable composite structural chromogenic material.

EMBODIMENT 7

1. Using spin casting method, the emulsion of zinc oxide microspheres having a solid content of 10% was orderly assembled on the TPU film to prepare photonic crystal.

2. The hot-pressing equipment was preheated to 120° C. Another TPU film layer was covered on the TPU film having the photonic crystal layer. The two TPU film layers were bonded into a whole through hot-pressing with a pressure of 8 kN, to obtain a structurally stable composite structural chromogenic material.

Embodiment 8

1. Using spray coating method, the emulsion of bisphenol formaldehyde resin microspheres having a solid content of 10% and a diameter of 239 nm was sprayed on a PVC film to disorderly assemble and prepare amorphous photonic structure. Another PVC film layer was covered on the PVC film having amorphous photonic structure.

2. The above operations were repeated to form a composite structure with five layers, in which the structural chromogenic materials are respectively between the continuous polymer layers on both sides.

3. The hot-pressing equipment was preheated to 120° C. The peripheral edges of all PVC layers were bonded into a whole through hot-pressing with the pressure of 8 kN, to obtain a structurally stable composite structural chromogenic material.

Embodiment 9

1. Using printing method, the emulsion of titanium dioxide microspheres having a solid content of 10% and a diameter of 230 nm was printed on the PVC film to disorderly assemble and prepare the structural color patterns.

2. The hot-pressing equipment was preheated to 120° C. Another PVC film layer was covered on the PVC film having structural color patterns. The two PVC film layers were made fit and bonded into a whole through hot-pressing, with the pressure of 8 kN, so as to obtain a structurally stable composite structural chromogenic material.

Embodiment 10

1. Under the cover of a hollow-out mold, using spraying method, the emulsion of bisphenol formaldehyde resin microspheres having a solid content of 10%, wherein the mass fraction of polyacrylate adhesive in the emulsion is 1%, was sprayed on the PVC film to disorderly assemble and prepare amorphous photonic structure patterns.

2. The hot-pressing equipment was preheated to 120° C. Another PVC film layer was covered on the PVC film having amorphous photonic structure patterns. The two PVC film layers were bonded into a whole through hot-pressing with a pressure of 8 kN, to obtain a structurally stable composite structural chromogenic material.

The above embodiments are only used to help better understand the core idea and technical method of the present disclosure, but cannot limit the protection scope of the present disclosure. It should be noted that those ordinary skilled in the art may make various improvements and variations to the present disclosure on the basis of the principles of the present disclosure shall fall within the protection scope of the present disclosure. Any equivalent replacement or modification made according to the spirit and essence of the present disclosure shall fall within the protection scope of the present disclosure.

The invention claimed is:

1. A structurally stable composite structural chromogenic material, comprising: an upper surface layer, a lower surface layer, and one or more intermediate layers therebetween,
   wherein the upper surface layer and the lower surface layer are each a thermoplastic polymer film, and the one or more intermediate layer is a layer of structural chromogenic material, and is disposed between two thermoplastic polymer films, and
   wherein the upper surface layer and the lower surface layer are bonded together along the peripheral edges by hot-pressing at a temperature ranging from 80C to 2500 C and a pressure of 4 kN to 16 kN to form the structurally stable composite structural chromogenic material.

2. The composite structural chromogenic material according to claim 1, wherein a total number of layers in the composite structural chromogenic material is 3 to 15.

3. The composite structural chromogenic material according to claim 1, wherein the at least one layer of structural chromogenic material comprises micro-nano spheres, wherein the micro-nano spheres are inorganic microspheres or heat-resistant organic microspheres having a diameter of 10 to 1000 nm, which are solid or hollow, and wherein the heat-resistant organic microspheres are organic microspheres having a vitrification temperature higher than that of the thermoplastic polymer film.

4. The composite structural chromogenic material according to claim 3, wherein the inorganic microspheres are silicon dioxide microspheres, titanium dioxide microspheres, zinc oxide microspheres, alumina microspheres, zirconium dioxide microspheres, or vanadium pentoxide microspheres; and the heat-resistant organic microspheres are cross-linked polymer microspheres or sulfur-containing resin microspheres.

5. The composite structural chromogenic material according to claim 1, wherein the thermoplastic polymer film is a polyethylene film, a polypropylene film, a polyvinyl chloride film, a polystyrene film, a polyformaldehyde film, a polycarbonate film, a polyamide film, an acrylic plastic film, a film of polyolefins and copolymers thereof, a polysulfone film, a polyphenyl ether film, a polyurethane film, a polytetrafluoroethylene film, or a polyethylene terephthalate film.

6. A method for preparing the structurally stable composite structural chromogenic material according to claim 1, comprising:
   assembling a first emulsion containing micro-nano spheres having a solid content of 5% to 30% on a first thermoplastic polymer film to form a layer of micro-nano spheres;
   covering the layer of micro-nano spheres with a second thermoplastic polymer film;
   hot-pressing to bond the peripheral edges of the first and the second thermoplastic polymer films to form a composite structural chromogenic material unit; and
   hot-pressing to bond two or more of the composite structural chromogenic material units.

7. A method for preparing the structurally stable composite structural chromogenic material according to claim 1, comprising the steps of:
   building a first structural color layer by assembling an emulsion of micro-nanospheres having a solid content of 5% to 30% on a first thermoplastic polymer film;
   covering the first structural color layer with a second thermoplastic polymer film;
   building a second structure color layer on the second thermoplastic polymer film; covering the second structural color layer with a third thermoplastic polymer film;
   building a second structural color layer by assembling an emulsion of micro-nanospheres having a solid content of 5% to 30% on a second thermoplastic polymer film; and
   repeating, sequentially, the building step and the covering step until a pre-determined number of structural color layers are obtained,
   and bonding the peripheral edges of all the thermoplastic polymer films are bond together using hot-press.

8. The method according to claim 6, wherein the first emulsion further contains an adhesive, wherein the adhesive is at least one selected from dopamine and derivatives thereof, Arabic gum, natural gum, natural rubber, polyurethanes, polyureas, polyacrylates, phenolic resins, epoxy resins, and polyvinyl alcohols, and a mass fraction of the adhesive in the first emulsion is up to 20%.

9. The method according to claim 6, wherein the method of assembling is heating assembly method, deposition, blade coating, spin casting, drop casting, spray coating, or printing.

* * * * *